May 2, 1961  R. G. ANSCHUTZ  2,982,557
COLLET CHUCK

Filed June 10, 1959  4 Sheets-Sheet 1

INVENTOR.
Reynold H. Anschutz,
BY
John H. Leonard,
his ATTORNEY.

May 2, 1961 R. G. ANSCHUTZ 2,982,557
COLLET CHUCK
Filed June 10, 1959 4 Sheets-Sheet 2

INVENTOR.
Reynold G. Anschutz,
BY John H. Leonard,
his ATTORNEY.

May 2, 1961 R. G. ANSCHUTZ 2,982,557
COLLET CHUCK
Filed June 10, 1959 4 Sheets-Sheet 4
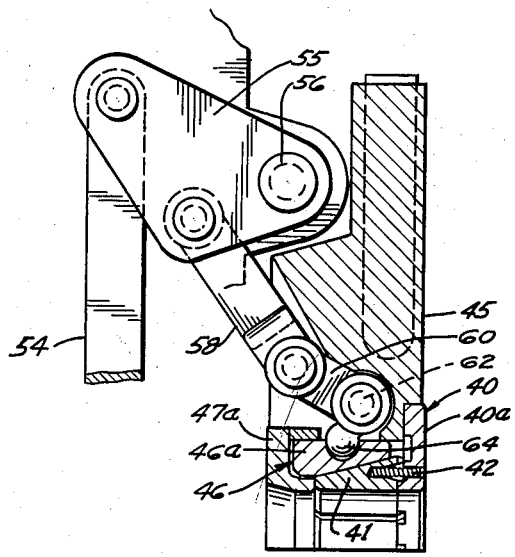
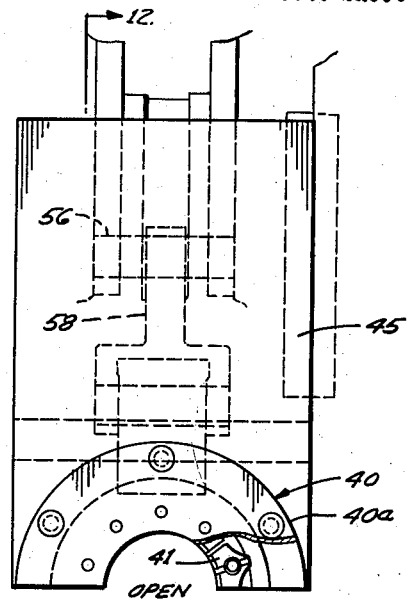
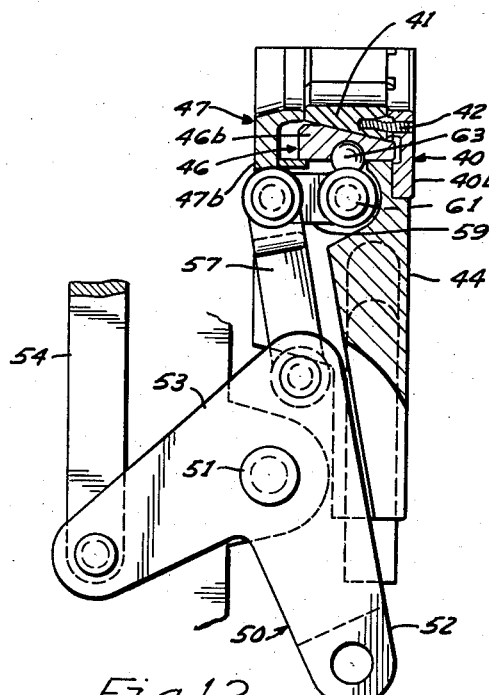
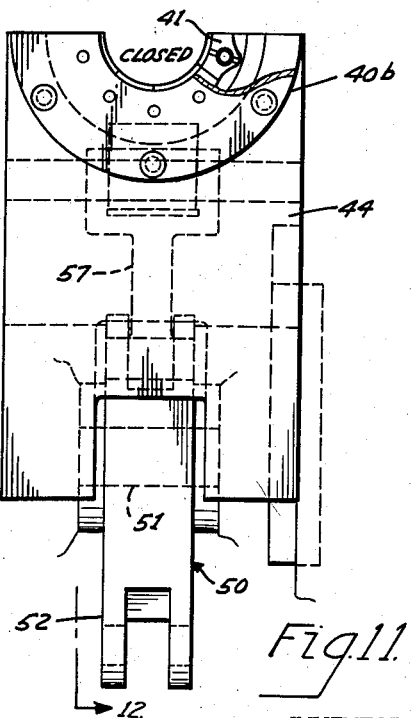
Fig.12. Fig.11.
INVENTOR.
Reynold G. Anschutz,
BY
John H. Leonard,
his ATTORNEY.

United States Patent Office 2,982,557
Patented May 2, 1961

2,982,557

COLLET CHUCK

Reynold G. Anschutz, Willoughby, Ohio, assignor to The Pipe Machinery Company, Wickliffe, Ohio, a corporation of Ohio Filed June 10, 1959, Ser. No. 819,418

8 Claims. (Cl. 279—57)

This invention relates to collet chucks and particularly to a new and improved collet for use in connection therewith.

Collet chucks of this general character comprise essentially a group of individual gripping jaws which are arranged in a group in circumferentially spaced relation to each other about a common axis of rotation and are supported so that they can be moved toward and away from the common rotational axis for gripping a workpiece to be held thereby.

While in some collets the jaws are provided by slitting a cylindrical member part way along its length, in most of the heavier duty collets the jaws are a separately formed element.

Generally, each jaw is provided on either its inner or outer surface, depending upon whether the group is to engage the inner or outer periphery of an article or workpiece to be held, with suitable cam surfaces, which diverge uniformly from the axis of the jaws in an axial direction. The cam surfaces are engaged generally by a common jaw-operating cam member which, by movement axially of the jaws, either expands or contracts the collet by virtue of the cooperative engagement of the wedging surfaces. In many collets it is desirable that the jaws be retained in assembled condition on a suitable support so that the collet as a unit, or a major fractional assembled unit thereof, can be inserted or removed from the chuck. However, considerable difficulty has been experienced in mounting the jaws on the support in such a manner that they can move properly to their expanded and contracted positions.

One prior common practice is to provide on the individual jaws leaf springs of considerable length which, near one end of the jaws, extend from the side of the jaws for a considerable distance, and which at their ends remote from the jaws are suitably anchored or connected to a support. The elongated type of spring is for the purpose of supporting and guiding each jaw for swinging from contracted to expanded positions about an axis extending transversely of, and spaced from, the jaws in the general direction of the axis of the group of jaws. The reason for the long radius is to cause the jaw to move as nearly as may be parallel to its original starting position.

Because of limitations of size and for simplification, it is desirable that such spring supports be relatively short. Consequently, a compromise was reached for the range of sizes of articles which could be gripped by a given size collet, between too large a size of chuck collet and too great a degree of curvature of the path of movement of the jaws from expanded to contracted position.

As a result, within practical limits, collets of this type were very limited in the range of cross sectional dimensions of work pieces which could be grasped and held by one particular collet.

Furthermore, under no conditions could each of the jaws so mounted move in a radial direction relative to the axis of the group parallel to its original starting position. Again, collets of this type were difficult to assemble.

Another arrangement was to provide a circumferentially extending helical spring which engaged in circumferential notches in the outer periphery of the jaws and held them in assembled relation. Such springs, however, tended to loosen and not to hold the jaws properly. Furthermore, if such springs were arranged on the inside of the jaws, they tended to accumulate a large amount of dirt.

In order to overcome some of the disadvantages of the prior types of collet, a later type collet was developed in which the individual jaws were arranged in a group in spaced circumferential relation to each other about a common axis. These jaws were mounted in, or held separated from each other by, rubber or elastomeric material which was relatively stiff but somewhat resilient. This type of mounting provided for a more nearly radial movement of the jaws toward contracted or expanded position by elastic deformation of the rubber by which the jaws were supported. However, this type of collet also had its limitations, such as the limited radial displacement permitted the jaws due to the shearing characteristics of the elastomeric material. A peculiar disadvantage of this prior structure is that it limits the diameter in which a chuck can be made and the range through which it can operate. In large diameter chucks generally, the tolerance, while the same in percentage of movement as for a small chuck is greater as measured in inches. However, in the larger chucks, the limitations imposed upon displacement of the rubber or mounting material due to the shearing characteristics of the material do not allow any greater tolerance in inches than is allowed for very small chucks. Furthermore, the rubber or mounting material interposed in the spaces between the circumferentially spaced jaws in the thickness, circumferentially of the jaws, necessary for affording substantial movement of the jaws limits the circumferential dimension of each jaw itself for a given size chuck, and this is particularly true in large chucks. Further, if the jaws are contracted to engage a part which is considerably undersize, the supporting material tends to squeeze out between the jaws and it itself, instead of the jaws, grips and supports the work piece. A typical arrangement of such rubber-mounted jaws is described in Patent No. 2,346,706.

It is one of the objects of the present invention to provide a collet chuck comprising a plurality of individual gripping jaws arranged in a group in circumferentially spaced relation about a common rotational axis, and supported on a supporting plate of limited thickness axially of the jaws so that they can move in a true radial path parallel to their starting positions toward and away from the common axis.

Another object is to provide a collet of this character wherein both the base and the front of each jaw is maintained parallel with its original position during retraction and expansion of the jaws relative to the common axis.

Another object is to provide a simple and effective means for holding the jaws assembled on the supporting plate or base.

A more specific object is to provide a collet of this character which, while not employing elastomeric material for securing the jaws together and to their support, has its jaws assembled on a support which is as short as that which can be made with the elastomeric type of mounting.

Another object is to provide a collet having a much greater range for a given size than those heretofore provided, which is easily assembled and retains its assembled condition throughout long periods of use, of which the connecting means for the jaws are shielded from conditions which would deteriorate rubber and elastomeric materials and other types of internal spring mountings, which is not adversely affected by the greases, chemicals, heat, and cold to which collets are ordinarily subjected in use.

Other objects and advantages of the invention will become apparent from the following description wherein reference is made to the drawings, in which:

Figs. 1, 2, and 3 are front, left end, and right end elevations, respectively, of a collet embodying the principles of the present invention, part of Fig. 1 being shown in section for clearness in illustration;

Figs. 4, 5, and 6 are front, left end, and right end elevations, respectively, of the collet illustrated in Figs. 1, 2, and 3, showing the collet in operating position, part of Fig. 4 being shown in section for clearness in illustration;

Fig. 11 is a front end elevation, partly in section, of the split collet of Figs. 9 and 10 in combination with a split chuck adapted for side feeding of the work piece, and showing the chuck in open position in the upper half and in the closed position in the lower half; and Fig. 12 is a sectional view taken on the line 12—12 of Fig. 11.

Figure 3:
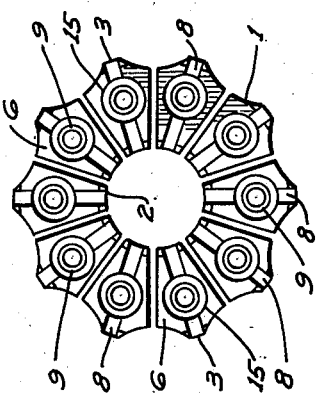
Figure 6:
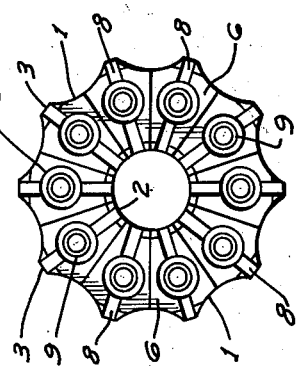
Figure 1:
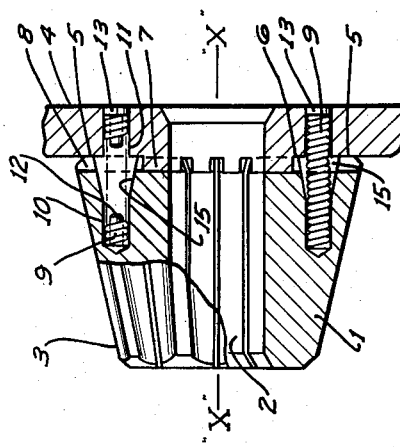
Figure 4:
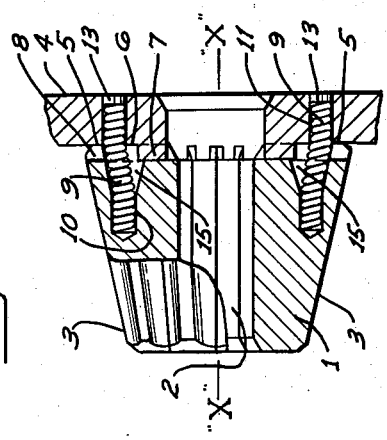
Figure 2:
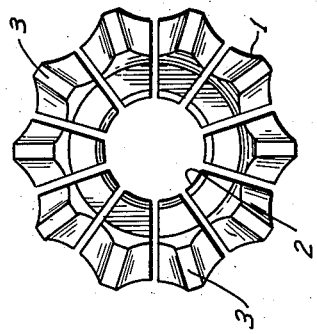
Figure 5:
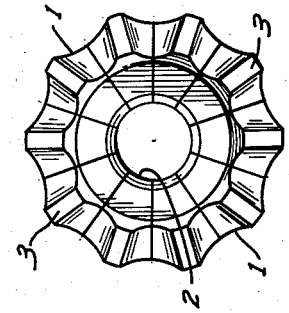

Referring to the drawings, the collet comprises a plurality of elongated jaws 1 arranged in a group in circumferentially spaced relation to each other about a common axis x—x. In the form illustrated, the jaws are shown as those of the type which are used in a contracting collet and arranged to grip a workpiece at their radially inward surfaces by being moved concurrently inwardly toward their common axis, the use of the invention in connection with expanding types of collets to grip by their outer surfaces the inside of annular workpieces being apparent from the illustrative example.

Each of the jaws 1 is provided at the face facing the axis with a gripping face 2 which, in the case of the present jaws, since they are to be moved in all cases parallel to their normal starting position, may be the same at all portions along their length in section in a plane normal to the common axis, as distinguished from the surfaces of collet jaws supported for swinging into operating position in which types the workpiece engaging surface is modified in small increments along the axial length of the face in order to compensate for the swinging path of the chuck jaws.

Each jaw is provided on its outer surface with a wedge surface 3 which preferably is of limited extent circumferentially of the jaws and which diverges from the common axis of the jaws in a direction toward the support of the jaws.

In order to support the jaws in assembled relation in a group, a suitable supporting member or plate 4 is provided, and the jaws 1 are supported at the end of the group facing the support or plate 4, the end of each jaw, at that end of the group, being in contact with and guided by the plate 4. For this purpose, the face of the plate 4 exposed toward the group of jaws is provided with a slide surface 5 which preferably is a planar annular surface normal to the common axis x—x and thus supplies guide surface areas for corresponding guide surface areas 6 on the adjacent ends of the jaws, respectively.

The surface areas on the plate 4 and the complementary areas 6 on the jaws 1 are, as indicated, preferably coplanar and lie in a plane normal to the common axis of the jaws.

In order to constrain the jaws 1 to move radially toward and away from the common axis, a spline connection is provided between the end of each jaw and the plate 4. In the form illustrated, a spline, indicated at 7, is formed on the plate 4 and a guiding recess 8 in which the spline is snugly received for endwise sliding movement, is provided on the end of the associated jaw 1. Obviously, these may be reversed, if desired.

The splines preferably are arranged and extend radially of the common axis of the jaws and fit the ends of the jaws with only operating clearance so that the jaws are constrained to move radially without rotation about their individual axes by virtue of the guiding surfaces on the spline 7 and the cooperative guiding surfaces in the recess in the ends of the jaws, plus the cooperating surfaces 5 and 6 on the ends of the jaws and on the plate.

Each one of the jaws is constrained, when such surfaces are in contact, to move at all times parallel to its original position. Thus there is provided a guide means on the jaws with complementary guide means on the plate supporting and guiding the jaws for individual bodily sliding radial movement parallel to their respective starting positions in directions toward and away from the common axis x—x.

In order to hold the jaws assembled on the support 4 with these various cooperating slide surfaces in coaction with each other so that the jaws move parallel to their respective starting positions toward and away from the common axis, resilient means are provided and are connected to the plate.

These resilient means yieldably urge the jaws endwise toward the plate 4, thus resiliently holding the guide means of each jaw in guiding contact with its complementary guide means on the plate 4. In the form illustrated, the resilient means for holding the jaws in this assembled relation and for this movement, and likewise for returning the jaws to starting position when they are released, may comprise springs 9 which are elongated and arranged with their axes extending generally parallel to or endwise of the common axis. These springs are arranged preferably one to each jaw. Each spring is connected at one end to its associated jaw and at the other end to the plate 4.

As mentioned, it is desirable that the length of the chuck be reduced to as small a dimension as possible. In the present structure, this is accomplished with the spring connection of the jaws to the support 4 without lengthening the length of the collet over what would be required were no connecting means provided for connecting the jaws to the plate. This is accomplished by providing in each jaw a suitable socket 10 which extends generally endwise of the jaw and is relatively deep and is open at the end of the jaw facing the plate 4.

The plate 4 likewise is provided with a passage or socket 11 which extends entirely therethrough and in which the opposite end of the spring 9 is accommodated. The end of the spring 9 is secured in the inner end of the socket 10 of the jaw 1 preferably by being expanded and pressed firmly therein by driving therein through the spring an expanding pin 12. The opposite end of the spring is securely fastened in the socket 11 of the support 4 by driving thereinto a suitable headed expanding pin 13.

The socket of the jaw, or its associated socket in the plate 4, at a location adjacent the contact guide surfaces 5 and 6 on the end of each jaw and the plate, is made considerably wider and larger in cross section than the cross section of the spring 9 for a substantial distance from the guide surfaces toward the inner end of the socket. By virtue of this arrangement, the spring can be deflected elastically bodily laterally while the jaw remains in position parallel to its starting position.

In the form illustrated, this enlargement is obtained by forming it in the socket 10 of the jaw, instead of in the plate. As shown, the walls of the socket beginning a distance inwardly from its open end and extending toward its open end are divergent toward the plate 4, as indicated at 15. As a result, the spring can remain in fixed position in the plate 4 for the full thickness of the socket 11, whereas the portion of the spring in the portion 15 of the socket can be flexed transversely.

The springs are preferably tightly wound so that they exert on the jaws a slight force axially of the springs which hold the jaws snugly seated against the cooperating guiding surfaces of the plate 4.

Figure 8:
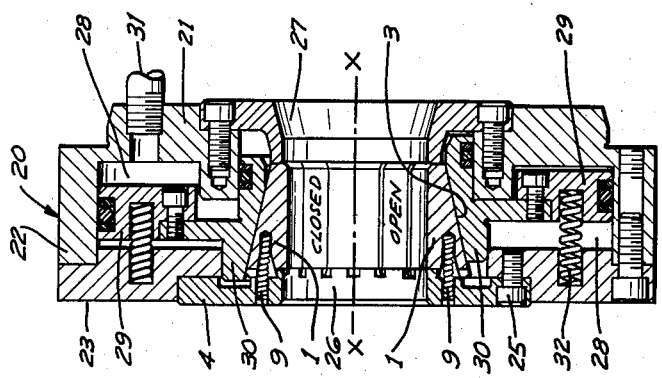
Fig. 8 is a vertical sectional view through the axis of the chuck illustrated in Fig. 7, showing, in the upper half, the jaws in operating position and showing, in the lower half, the jaws in inoperative position.
Figure 7:
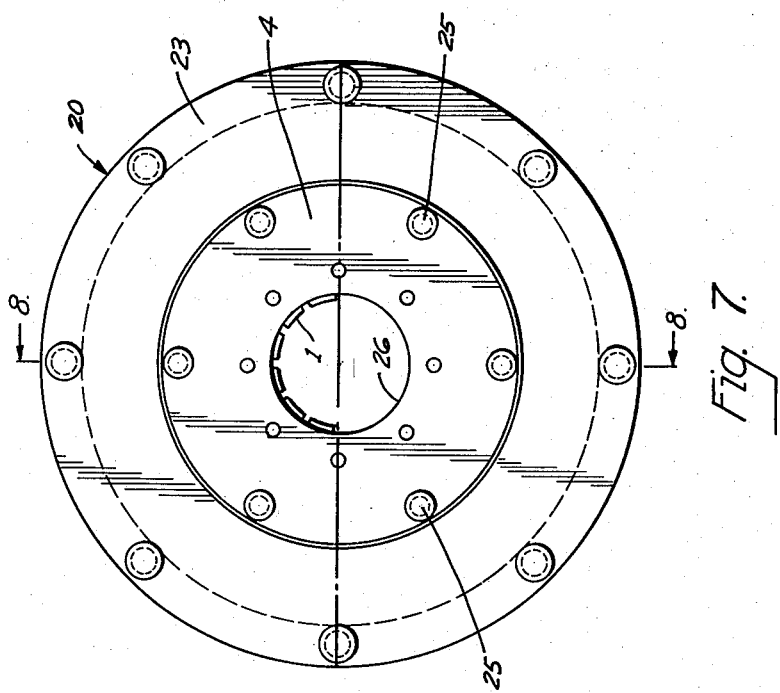
Fig. 7 is a left end elevation of a chuck in which the present collet is incorporated, part thereof being shown in section for clearness in illustration.

As illustrated in Figs. 7 and 8, the collet comprising the plate 4 and the jaws 1 assembled thereon is mounted for use in a suitable chuck, indicated generally at 20. This chuck may comprise a body having an annular end wall 21 adapted to be secured to a suitable spindle of a machine, and a peripheral annular wall 22 extending from one face thereof. The opposite end of the wall 22 is connected to a suitable closure plate 23 to which, in turn, the plate 4 is connected by suitable bolts, such as indicated at 25. The plate 24 has the usual central opening 26 coaxial with a corresponding opening 27 in the wall or plate 21 and with the axis x—x.

The interior portion of the chuck body thus formed is in the form of an annular hydraulic or air cylinder 28 in which is reciprocable a suitable annular piston 29 which, at its inner periphery, carries a suitable annular jaw contracting cam member 30 which is engageable concurrently with the cam surfaces 3 of the jaws for moving the jaws relatively toward each other concurrently when the piston is moved axially in one direction. Suitable pressure fluid is admitted into the cylinders through a port 31 which is adapted for connection to a suitable fluid pressure supply line.

Suitable return springs 32 are provided for returning the piston 29 and jaw contracting member 30 to their starting positions when the hydraulic or fluid pressure is relieved, thus allowing the jaws to return or be restored to their normal uncontracted condition by the springs 9.

The connecting springs 9 of the jaws preferably are connected to the jaws so that when the jaws are fully released, the springs 9 have their axes straight and parallel to the common axis of the jaws.

Upon operation of the piston to the left in Fig. 8, the jaw contracting cam member 30 operates to move the jaws inwardly toward the axis concurrently, thus deflecting the springs 9 bodily transversely of their axis and thus offsetting one end of each spring 9 from its other end. However, when the annular jaw contracting member is returned to starting position and releases the jaws, the springs 9 are self-restoring and return to their original position, thus returning the jaws. Accordingly, therefore, the springs 9 operate not only as a means for holding the jaws in assembled condition against their guide surfaces on the plate 4 and for the proper movement parallel to their original or starting positions toward the common axis concurrently, but also as a return means for restoring the jaws to their starting positions when the jaws are released.

Since the jaws move at all times parallel to their starting positions and since the camming action is effective along the entire length of the camming surfaces 3, the inner or workpiece engaging faces of the jaws may be the same cross section throughout the length of the jaws, if a cylindrical part is to be gripped. On the other hand, if a part which is symmetrical about the common axis of the jaws is to be gripped, the inner face of the jaws can be shaped to conform to the part without requiring any allowance for the swinging path of the jaws or any path not parallel to the starting position of the jaws.

Figure 9:
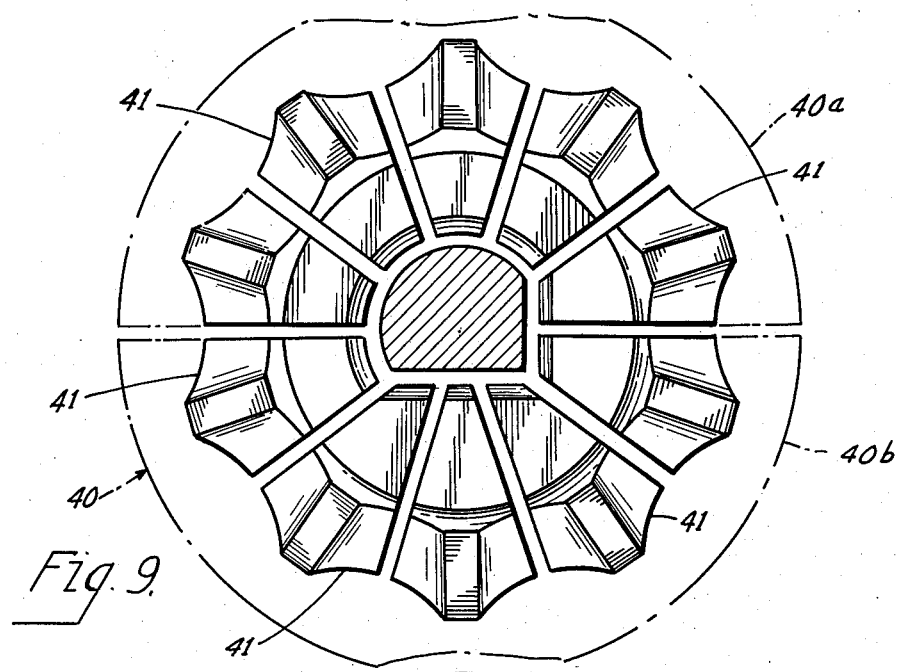
Figs. 9 and 10 are a front end elevation of a split collet embodying the principles of the present invention and arranged to grip a work piece of unsymmetrical cross section and showing the collet in expanded and contracted positions, respectively.
Figure 10:
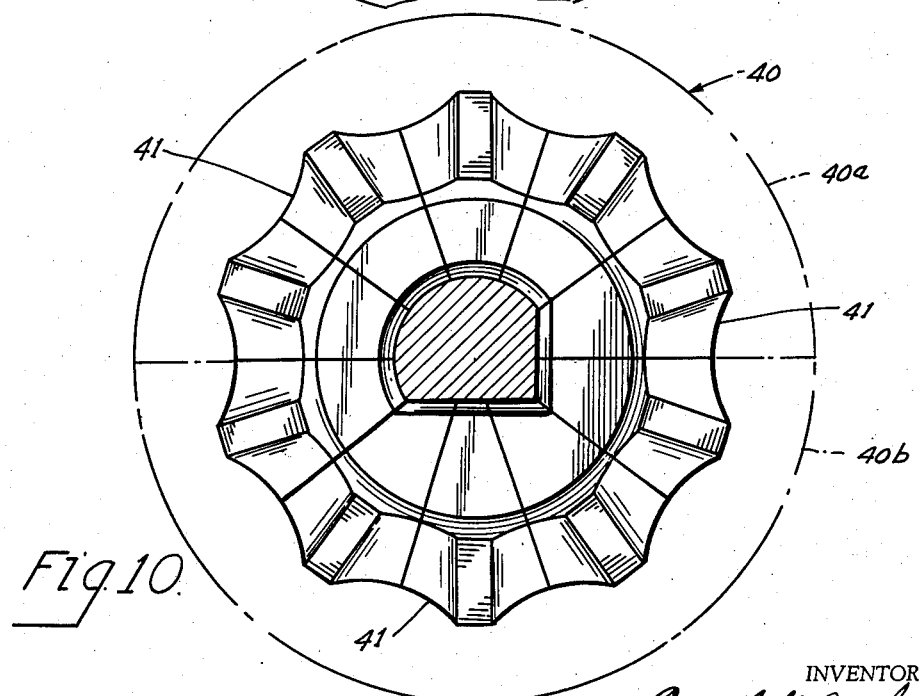

Referring next to Figs. 9 through 12, the collet of the present invention is shown as arranged for use in a split chuck which is made in two symmetrical halves which opens so as to receive the workpiece radially of the chuck axis. Further, for purposes of illustration, the collet shown in Figs. 9 and 10 is one which is adapted to receive a workpiece of irregularly shaped cross section.

As there illustrated, the collet includes an annular supporting split plate 40 made in two halves 40a and 40b, each of which preferably is semi-circular about the axis of rotation of the chuck. A plurality of jaws 41 are mounted on the plate 40, the jaws and jaw mountings being in all respects the same as the jaws 1 and their mountings heretofore described. The plate 40 is the same in all respects as the plate 4 except that it is split diametrally to form two halves 40a and 40b so that each half and its assembled jaws can be moved bodily toward and away from the other half diametrally.

The number of jaws chosen for each half plate and the arrangement thereof depends upon the cross sectional shape of the piece to be gripped. One or more jaws may be arranged for engaging each side face of the workpiece.

Each of the jaws 41 is held on its associated half of the plate 40 by a spring 42, in the manner hereinbefore described in connection with springs 9, as illustrated in Figs. 11 and 12.

In Figs. 11 and 12, the two portions of the collet are shown as mounted in a suitable type of split chuck which is somewhat diagrammatically illustrated. In Figs. 11 and 12 the split chuck is shown as one having two radially movable jaws 44 and 45, respectively, which are movable toward and away from each other and the common axis of rotation of the chuck. The chuck is of the type to grip the external surface of the workpiece, and the jaws 41 are actuated by the halves 46a and 46b of a split cam member 46 which, except for being split, is the same as the cam member 30 heretofore described. The plate halves 40a and 40b are secured in any suitable fashion to the chuck jaws 44 and 45, respectively. A face split plate 47 having two half portions 47a and 47b, which together define substantially the same cross section as that of the irregular workpiece so that the workpiece must be inserted into the chuck in the proper rotated position about its axis, is provided.

Any suitable means may be provided for moving the jaws 44 and 45 relatively toward each other. In the form illustrated, this is done by means of a toggle arrangement. Briefly, this toggle arrangement comprises a rocker 50 for the chuck jaw 44. The rocker 50 is mounted for rocking about a fixed shaft 51 on the machine frame portion which supports the chuck. The rocker has an arm 52 which is adapted to be connected to a suitable source of power for rocking the rocker and has an additional arm 53 which is connected by a tie 54 to a rocker 55 for the chuck jaw 45. The rocker 55 is rockable about a shaft 56 fastened to the machine frame portion which supports the chuck. Links 57 and 58 connect the rockers 50 and 55, respectively, to the cam operating rockers 59 and 60, respectively, which are pivotally mounted by pivots 61 and 62 on the jaws 44 and 45, respectively, for movement with the chuck jaws toward open and closed positions and also for rotation about the axes of the pivots 61 and 62, respectively. The rockers 59 and 60 include suitable ball lugs 63 and 64, respectively, which are in operative engagement with the halves 46b and 46a, respectively, of the cam member 46, for operating them.

In operation, upon rocking of the rocker 50 in a clockwise direction in Fig. 12, the link 57 is pulled downwardly to the right, thus rocking the rocker 59 in a counterclockwise direction, whereupon the lug 63 swings upwardly to the left in Fig. 12 and thereby moves the cam half 46b in the direction for releasing the jaws 41. Concurrently, the same clockwise rocking movement of the rocker 50 causes a clockwise movement of the rocker 55 which pulls the link 58 upwardly to the left and thereby rocks the rocker 60 clockwise about its fixed axis 62, thereby moving the ball lug 64 upwardly to the left in Fig. 12, and correspondingly moving the attached half 46a of the cam member 46 to the releasing position.

Upon rotation of the rocker 50 in the counter-clockwise direction, the rocker 55 is correspondingly rocked by the tie 54 in the same, or counter-clockwise direction and, in Fig. 12, the rocker 59 is rocked clockwise and the rocker 60 is rocked counter-clockwise, thus concurrently moving the halves 46b and 46a of the cam member 46 to position to contract the collet.

Since the toggle mechanism is connected to the chuck jaws by the pivots 61 and 62, the same mechanism which closes and opens the collet also closes and opens the chuck jaws 44 and 45, moving the collet and jaws concurrently to closed position and concurrently to open position.

Thus the principles of the collet hereinbefore described can readily be incorporated in a collet for either type of chuck. In the case of the closed chuck, the supporting plate at the end of the group of jaws is solid, whereas in the case of a split chuck, the supporting plate at the end of the group of jaws is a split plate. In either event, the jaws are mounted on their support as a group in spaced relation about a common axis of rotation and are held by their resilient means in proper assembled relation with respect to each other and with respect to the support, so that at all times during operation they can be moved by the actuating means parallel to their original starting positions.

From the foregoing description, it will be seen that the length of the collet is quite limited, yet the jaws, while moved toward and away from the axis of rotation, remain parallel to their respective starting positions. Furthermore, the structure is very simple, the resilient means used to hold the collet jaws on their support functioning also to return the jaws to their starting position when the collet jaws are released by the cam member 46.

Having thus described my invention, I claim:

1. A collet comprising a group of individual gripping jaws, a supporting plate supporting the jaws in circumferentially spaced relation to each other about a common axis extending from one face of the plate, complementary slide surfaces on the ends of the jaws, respectively, at one end of the group and on the plate at said face, said slide surfaces supporting the jaws for individual bodily movement in directions toward and away from said axis in paths at acute angles to each other with each jaw parallel to its gripping position, springs on the jaws respectively, each spring having one end connected to the plate and the other end connected to its associated jaw, each spring yieldably urging its associated jaw endwise of the group toward the plate and resiliently holding the slide surface of its associated jaw in sliding contact with the complementary slide surface of the plate, said springs extending generally endwise of the collet and each spring being elastically deflectable transversely of the collet axis by movement of its associated jaw in said directions from a predetermined normal position in which the spring is undeflected, said complementary slide surfaces being related to the position of the springs so that, when the springs are undeflected and the associated jaws unconstrained radially other than by the undeflected springs, the axes of the springs are within the radial limits of the sliding surfaces of the plate.

2. A collet comprising a plurality of individual gripping jaws, a supporting plate supporting the jaws in a group in circumferentially spaced relation to each other about a common axis extending from one face of the plate, complementary slide surfaces on the ends of the jaws, respectively, at one end of the group and on the plate at said face, said slide surfaces supporting the jaws for individual bodily movement in directions toward and away from said axis in paths at acute angles to each other with each jaw parallel to its gripping position, springs on the jaws, respectively, each spring having one end connected to the plate and the other end connected to its associated jaw, each spring yieldably urging its associated jaw endwise of the group toward the plate and resiliently holding the slide surface of the associated jaw in sliding contact with the complementary slide surface of the plate, said springs extending generally endwise of the collet and each spring being elastically deflectable transversely of the collet axis by movement of its associated jaw in said opposite directions, and spline connections between the plate and jaws, respectively, for guiding each jaw toward and away from the collet axis while maintaining it parallel to its gripping position, and all of the complementary sliding surfaces being coplanar, each jaw having a socket extending substantially parallel to the axis of the collet and opening toward the plate, said plate having sockets respective to the sockets of the jaws and opening toward the jaws, each plate socket normally being aligned with the socket of its associated jaw in the position in which the jaw is held by its spring when the jaw is unconstrained radially other than by the spring.

3. A collet comprising a group of individual gripping jaws, a supporting plate supporting the jaws in a group in circumferentially spaced relation to each other about a common axis extending from one face of the plate, complementary slide surfaces on the ends of the jaws, respectively, at one end of the group and on the plate at said face, and engageable with each other for supporting the jaws for movement in directions toward and away from said axis in paths at acute angles to each other while the jaws are parallel to their gripping positions, springs on the jaws, respectively, each spring having one end connected to the plate and the other end connected to its associated jaw, each spring yieldably urging its associated jaw endwise of the group toward the plate so as to resiliently hold the complementary slide surface of its associated jaw in sliding contact with the complementary slide surface of the plate, said springs extending generally endwise of the collet, and each being elastically deflectable transversely of the collet axis by movement of its associated jaw in said directions from a predetermined normal position in which the spring is undeflected, each jaw having a socket extending substantially parallel to the axis of the collet and opening through said end of the associated jaw toward the plate, said plate having sockets respective to the sockets of the jaws and opening, through said face of the plate, toward the jaws, each jaw socket normally being aligned with its associated plate socket in the position in which its associated jaw is held by the spring when the spring is so undeflected, the socket of each jaw being spaced inwardly from the peripheral surfaces of its associated jaw and the sockets of the plate being spaced inwardly from the peripheral surfaces of the plate, and each socket being open only at the end adjacent the complementary surfaces.

4. A collet according to claim 3 wherein each spring has its end portion respectively fitted into its associated sockets in immobilized condition relative thereto and a portion of the spring intermediate said end portions is deflectable transversely of the collet axis.

5. A collet according to claim 3 wherein each spring is a coiled spring and is disposed with its axis extending parallel to the axis of its associated sockets, and each end portion of the spring is secured in immobilized position in its associated socket by an expanding pin received in that portion and binding the exterior surface of the end portion of the spring to the wall of the socket.

6. A collet according to claim 3 wherein said springs hold the jaws assembled on said plate when the jaws are unconstrained from movement radially and axially other than by the springs.

7. A collet according to claim 3 wherein complementary splines and grooves are provided on the jaws and plate for guiding the jaws toward and away from the collet axis, each of the jaws has a stock gripping face at one side, and said complementary surfaces, splines, and grooves of each jaw block access of foreign matter into its associated socket from said one side.

8. A collet comprising a plurality of individual gripping jaws, a supporting plate supporting the jaws in a group in circumferentially spaced relation to each other about a common axis extending from one face of the plate, said plate being relatively thin in relation to the length of the jaws axially of the collet, cooperable slide surfaces on the end of the jaws, respectively, at one end of the group and on the plate at said face, said slide surfaces supporting the jaws for individual bodily movement in directions toward and away from said axis in paths at acute angles to each other, springs on the jaws, respectively, each spring having one end connected to the plate and the other end connected to its associated jaw, each spring yieldably urging its associated jaw endwise of the group toward the plate and resiliently holding the cooperating slide surface of the associated jaw in sliding contact with the complementary slide surface of the plate, said springs extending generally endwise of the collet and each spring being elastically deflectable transversely of the collet axis by movement of its associated jaw in opposite directions from a starting position, each jaw having a socket extending substantially parallel to the axis of the collet and opening toward the plate, said plate having sockets respective to the sockets of the jaws and opening toward the jaws, each plate socket normally being aligned with the socket of its associated jaw in the position in which the jaw is held by its spring when the jaw is unconstrained radially other than by the spring, the sockets of the plate being shorter than those of the jaws, the spring in each associated pair of sockets having its end portions connected fixedly in the sockets, the major portion of the deflectable portion of the spring being within the socket of the jaw, and each jaw socket being of larger cross section from its open end for a substantial distance toward its opposite end for affording space for said deflection of the spring.

References Cited in the file of this patent
UNITED STATES PATENTS

| | | |
|---|---|---|
| 952,320 | Fegley | Mar. 15, 1910 |
| 1,651,087 | Ellrich | Nov. 29, 1927 |
| 1,822,685 | Wilson | Sept. 8, 1931 |
| 1,875,737 | Johnson | Sept. 6, 1932 |
| 2,441,599 | Schneider | May 18, 1949 |